United States Patent
Estrada et al.

(10) Patent No.: US 6,647,806 B1
(45) Date of Patent: Nov. 18, 2003

(54) TURBULENCE CONDITIONER FOR USE WITH TRANSIT TIME ULTRASONIC FLOWMETERS

(75) Inventors: Herbert Estrada, Annapolis, MD (US); Donald R. Augenstein, Pittsburgh, PA (US)

(73) Assignee: Caldon, Inc., Pittsburgh, PA (US)

( * ) Notice: Subject to any disclaimer, the term of this patent is extended or adjusted under 35 U.S.C. 154(b) by 0 days.

(21) Appl. No.: 09/616,521

(22) Filed: Jul. 14, 2000

(51) Int. Cl.[7] .................................................. G01F 1/66
(52) U.S. Cl. .................................................. 73/861.28
(58) Field of Search ........................ 73/861.25, 861.26, 73/861.27, 861.28, 861.29, 861.31, 861.22, 861.23, 861.24; 210/435; 110/179; 138/44

(56) References Cited

U.S. PATENT DOCUMENTS

| | | | |
|---|---|---|---|
| 5,341,848 A | | 8/1994 | Laws |
| 5,495,872 A | * | 3/1996 | Gallagher et al. ............ 138/40 |
| 5,762,107 A | | 6/1998 | Laws |
| 5,959,216 A | | 9/1999 | Hocquet et al. |
| 6,158,288 A | * | 12/2000 | Smith ...................... 73/861.18 |

OTHER PUBLICATIONS

Araki, et al., In–sodium test of ultrasonic flowmeter for fast breeder reactor, May 1987, Transactions of the Society of Instrumental and Control Engineers, vol. 23, No. 5, pp. 447–454.*

Dordain, J. J., Steady–state and unsteady liquid flow–rate measurements: characteristics and performance on the ONERA ultrasonic flowmeter, 1980, North–Holland, Part II, pp. 39–46.*

James E. Gallagher, "A Novel Ultrasonic Flowmeter Concept", date before Jul. 13, 2000, 12 pages.

"Flow meter", *Pipe Line & Gas Industry,* Nov. 1999, p. 108.

* cited by examiner

*Primary Examiner*—Edward Lefkowitz
*Assistant Examiner*—Corey D. Mack
(74) *Attorney, Agent, or Firm*—Ansel M. Schwartz

(57) ABSTRACT

An apparatus for determining fluid flow in a pipe. The apparatus includes an ultrasonic flowmeter adapted to be placed with the pipe for measuring fluid flow in the pipe. The apparatus includes a turbulence-reducing flow conditioner adapted to be disposed in the pipe through which the fluid flow in the pipe passes and upstream to the flowmeter. A turbulence-reducing flow conditioner for an ultrasonic flowmeter for a pipe. A method for determining fluid flow in a pipe. The method includes the steps of flowing the fluid in the pipe through a turbulence reducing flow conditioner wherein the conditioner reduces turbulence intensity T of the fluid and increases frequency of residual turbulence of the fluid after the fluid has passed through the conditioner. Then there is the step of measuring the fluid flow in the pipe with an ultrasonic flowmeter after the fluid flow has passed through the conditioner. A method for reducing turbulence in a pipe for measuring flow in the pipe.

20 Claims, 4 Drawing Sheets

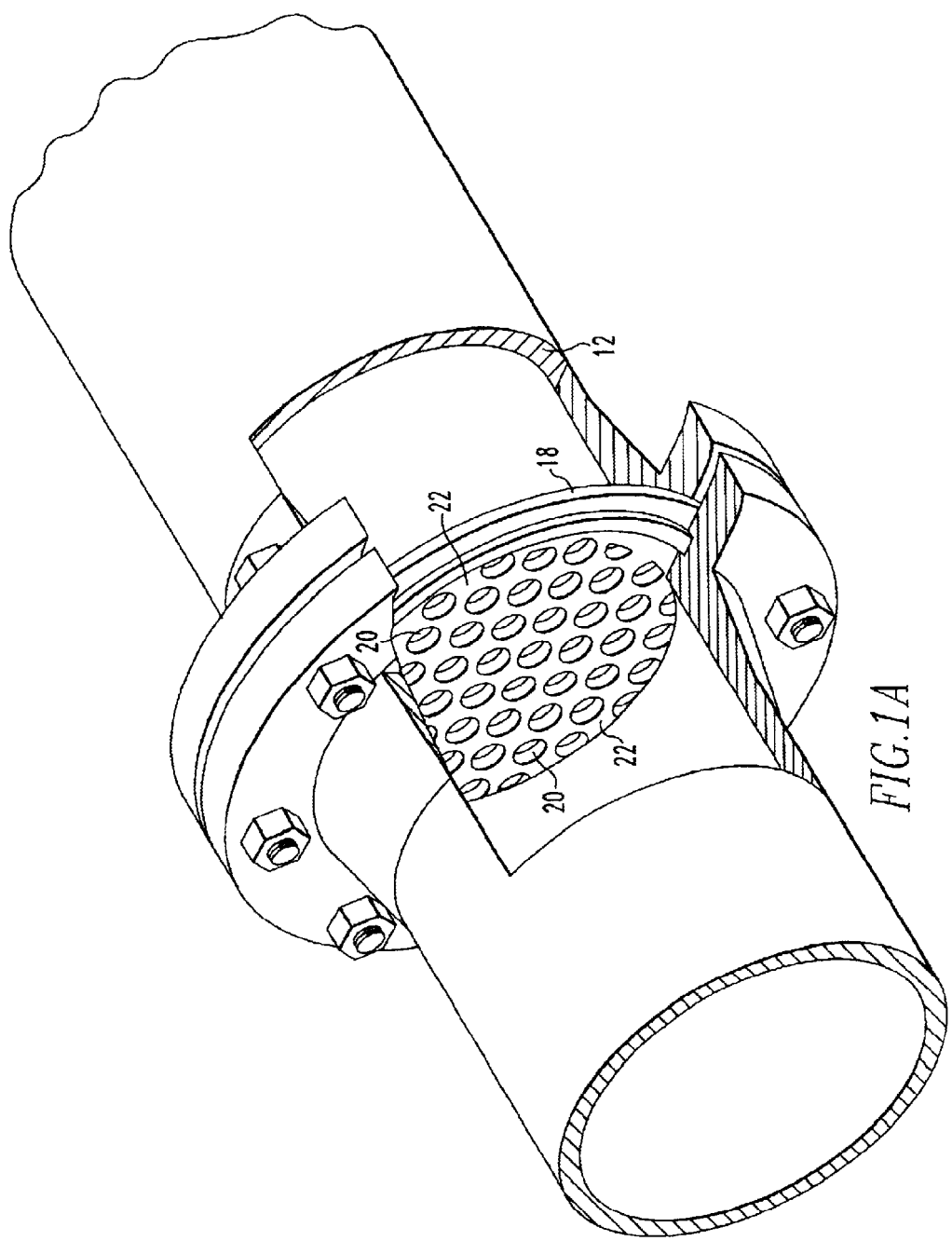

TURBULENCE CONDITIONER FOR USE WITH TRANSIT TIME ULTRASONIC FLOWMETERS

FIELD OF THE INVENTION

The present invention is related to the reduction of turbulence in a pipe. More specifically, the present invention is related to the reduction of turbulence with a conditioner so that the calibration coefficient of an ultrasonic flowmeter can be accurately determined using a volumetric displacement prover.

BACKGROUND OF THE INVENTION

Transit time ultrasonic flowmeters have exhibited excellent repeatability and absolute accuracy in many flow measurement applications. However, characteristics inherent in the nature of their measurements present difficulties when these meters are applied to custody transfer measurements of petroleum products. (A custody transfer takes place when ownership of a batch of a particular product changes. On a small scale, such a transfer takes place at the pump in a gas station.)

It is industry practice in custody transfer measurements to "prove" the meter; that is, to establish its calibration accurately, by independent means. Provers are usually devices of fixed and precisely established volume. The time required to deliver the volume of product defined by the prover is accurately measured by timing the transit period of a ball or piston, pushed by the product, from one end of the prover to the other. High-speed diverter valves initiate the prover run and bypass the prover when the ball reaches the end of its travel. The proving operation is synchronized with the operation of the custody transfer meter—the meter to be used to measure the amount of product delivered to a specific customer. The volumetric output measured by the custody transfer meter (in current practice, a turbine or positive displacement meter) during the prover run is compared to the volume of the prover and a meter factor (i.e., a calibration correction) is established.

It is also industry practice to perform a set of several prover runs—five is typical—to establish the "repeatability" of the meter factor of the custody transfer meter. Repeatability in the petroleum industry is usually defined as follows: the difference between the high and low meter factors from a set of prover runs, divided by the low meter factor from that set. Repeatability in the 0.02 to 0.05% range is taken as indicating that the custody transfer meter is in good condition—suitable for use in measuring the volume of the entire batch whose custody is to be transferred. [The batch volume may be hundreds or thousands of times larger than the prover volume.] The average meter factor as determined from the set of prover runs is used for the custody transfer measurement.

Unlike turbine and positive displacement flowmeters, a transit time ultrasonic flowmeter does not measure volumetric flow rate continuously, but instead infers it from multiple samples of fluid velocity. Specifically, the volumetric flow rate is determined from periodic measurements of the axial fluid velocity as projected onto one or more acoustic paths. The path velocity measurements are combined according to rules appropriate to their number and location in the pipe. Many meters employ parallel chordal paths arranged in accordance with a specific method of numerical integration.

The period over which an ultrasonic transit time meter collects a set of velocity measurements (one or more, depending on the number of paths) is determined by the path transit times, the number of paths, and/or the data processing capabilities of the meter itself. For liquid meters, the sample frequency will typically lie between 10 Hz and 1000 Hz.

An ultrasonic flow measurement is thus a sample data system on two counts:

(1) It does not measure the velocity everywhere across the pipe cross section but only along the acoustic paths, and (2) It does not measure velocity continuously, but instead takes a series of "snapshots" of the velocity from which it determines an average.

Because of these properties, a transit time ultrasonic meter responds to flow phenomena like turbulence differently than other meters commonly used for custody transfer in the petroleum industry. More specifically, the individual flow measurements of transit time ultrasonic meters will be affected by the small scale random (i.e., turbulent) variations in local fluid velocity. These variations are both temporal and spatial, and an ultrasonic instrument must make multiple measurements to determine the true average flow rate—to reduce the random error contributions due to turbulence to acceptable levels. Turbine meters and positive displacement meters, on the other hand, respond to the flow field in the pipe as a whole; integration of the fluid velocity in space and time is inherent in the nature of their responses. Nevertheless, transit time ultrasonic meters are not encumbered by physical limitations like bypass leakage and friction, and may therefore provide measurement capability over a wider range of velocity and viscosity conditions.

Although the velocity variations due to turbulence are random, multiple samples will only reduce their contribution to measurement uncertainty/repeatability—if the time interval over which the samples are taken is long compared to the periods of the low frequency contributors to the turbulence spectrum. Put another way, a transit time ultrasonic flowmeter can only meet petroleum industry expectations of repeatability—0.02 to 0.05%—if the number of samples of fluid velocity collected during a prover run include a large number of cycles of the lowest significant turbulence frequency. How many cycles? Enough to reduce the RMS contribution of this low frequency turbulence to the meter factor measurement to a level consistent with the repeatability requirements.

The centroid of the turbulence spectrum varies with fluid velocity. Caldon has measured turbulence intensity at Alden Research Laboratories over a range of fluid velocities typical of those encountered in petroleum and petroleum product pipelines. The data indicate a spectrum centered at about 3 Hz at about 4 feet/second. The spectrum is centered at: about 6 Hz at 8 feet/second, while it is centered at 10 Hz at a velocity of 14 feet/second. These frequency data are generally consistent with the turbulence literature. See, for example, "Structure of Turbulent Velocity and Temperature Fluctuations in Fully Developed Pipe Flow", M. Hishida and Y. Nagano, *Journal of Heat Transfer* February 1979, incorporated by reference herein. This reference and most others on the subject plot the turbulence energy spectrum against the wave number of the turbulence, given by $2\pi f/U$, where f is the frequency of the turbulence and U is the free stream velocity. The spectrum is expressed as turbulent energy per unit wave number increment. Turbulence intensity is here defined as $[\int^T u_i^2 dt/T]^{1/2}/U$, where $[\int^T u_i^2 dt/T]^{1/2}$ is the root mean square of the incremental turbulent velocities $u_i$ and U is the mean axial velocity. The incremental turbulent velocities $u_I$ represent the temporal and spatial departures of local velocities from the mean. T is a time period encompassing all significant turbulent variations.

The magnitude of the intensity measured by Caldon is also consistent with the literature. For a fluid path length roughly equivalent to a diametral path in a 16-inch pipe, an RMS intensity of 1.6% of the mean axial velocity was measured (for the 4 to 14 ft/sec fluid velocity range). This figure is comparable to that measured in much smaller pipes in the previously cited reference.

A 50-foot long pipe prover for pipeline operating at a flow velocity of 5 ft/sec will generate less than 10 seconds worth of flow data for each prover run. If the turbulence intensity is 1.6%, and the spectrum is centered near 4 Hz, about 40 samples of the low frequency turbulent variations will be collected during a prover run (in spite of the fact that the flowmeter might collect over 1000 measurements in the same 4 seconds). Five meter factor measurements from a single path flowmeter in this application would show a repeatability of about 0.6%. Multiple paths will reduce this figure to perhaps 0.3% or 0.4%; nevertheless all the numbers are at least an order of magnitude higher than the expectations for repeatability in the petroleum industry.

This, then, is the problem. Turbulence, such as normally encountered in petroleum pipelines, adversely affects the repeatability of the meter factors for transit time ultrasonic flowmeters, as measured in short duration prover runs. Unless something is done to alter the character of the turbulence, it appears that meter factors measured for ultrasonic flowmeters with conventional provers will not achieve repeatability figures meeting petroleum industry expectations.

It is important to note, however, that the long-term repeatability of transit time ultrasonic meters is entirely compatible with the custody transfer function. That is, if meter factor is established by a test or group of tests of 5 to 7 minutes total duration, the meter factor thus measured will accurately characterize a transfer of batch custody lasting many minutes or hours. Furthermore, the same meter factor will be found to apply to the same product day in and day out. Additionally, it will be found that the meter factors of some ultrasonic meters are insensitive to significant changes in product viscosity—due to changes in temperature, for example. These attributes—not characteristic of many currently used custody transfer meters—make it desirable to find a means to solve the problem of turbulence.

As further background in regard to this problem, accurate measurement of the lift and drag characteristics of wings and other airfoils in wind tunnels requires the elimination of turbulence because, in free flight, there are no disturbances of sufficiently small scale to produce appreciable aerodynamic effects. (The effect of so-called clear air turbulence on aircraft is produced by large-scale variations in air velocity and direction.) Hence, replication of free flight conditions in a wind tunnel requires the elimination of turbulence. In the 1940s, Dryden and Schubauer tested the effects of screens on the turbulence in wind tunnels, and determined that screens can produce substantial reductions in the intensity of the incident turbulence of a flowing air stream. Hugh L. Dryden and G. B. Schubauer, *The Use of Damping Screens for the Reduction of Wind Tunnel Turbulence*, Journal of the Aeronautical Sciences, April, 1947. Their work also includes a semi-empirical mathematical treatment of the mechanism whereby the turbulence is reduced. In the development of the present invention, the work of Dryden and Schubauer has been drawn upon and expanded, to suit the unique requirements of a transit time ultrasonic flow instrument.

The screens used by Dryden to reduce turbulence covered a range of configurations—from 18 to 60 mesh, with wire sizes ranging from 0.017 in (for coarser meshes) to 0.0075 in (for finer meshes). In general, the reduction in turbulence brought about by the screens was found to be given by $$T_1/T_0 = 1/(1+k)^{n/2} \qquad (2\text{-}1)$$

Where T=turbulence intensity=$[\frac{1}{3}(u^2+v^2+w^2)]^{1/2}/U$, the subscript 0 refers to incident conditions, the subscript 1 refers to conditions some distance downstream of the screen or screens, sufficient to allow eddies shedding from the screens themselves to have dissipated, u, v, and w are the rms components of the turbulent velocity variations along the x, y, and z axes respectively, U is the mean free stream velocity (i.e., at station 0), k is the energy loss per unit volume (head loss) through one screen, and n is the number of screens in cascade.

Using 6 screens in the settling chamber of his wind tunnel, Dryden was able to reduce an incident turbulence of 1.6% to 0.16% a short distance downstream of the screens. He effected a further reduction, by a factor of 6.6 in the test chamber of the wind tunnel, through the use of a convergent nozzle downstream of the settling chamber and leading into the test chamber. (A convergent nozzle is a standard feature of wind and water tunnels. Its function is to provide a uniform, high velocity profile in the test chamber.) The reduction in turbulence was due to the convergent nozzle's area ratio—also 6.6—which accelerated the main stream velocity without increasing the highly localized turbulence. The present invention is directed to solving the turbulence problem in transit time ultrasonic flowmeters.

U.S. Pat. No. 5,495,872 to Gallagher is involved with "swirl" and the conditioner of Gallagher is for the purpose of minimizing swirl to provide an axisymmetric velocity profile. Swirl is very different from turbulence in that swirl is the laminar movement of the flow at significant angles to the longitudinal axis of the pipe. Gallagher refers to angles of 15 degrees to 20 degrees which are reduced by his conditioner to about 2 degrees. Nowhere has Gallagher made any mention for any application of the conditioner with ultrasonic flow meters, nor recognized the relationship of turbulence with ultrasonic signals.

Conditioners to minimize swirl to about 2 degrees and provide for an axisymmetric velocity profile are well known in the art, such as disclosed in U.S. Pat. No. 5,341,848 to Laws, which also teaches for the conditioner to leave the turbulence structure unchanged; and U.S. Pat. No. 5,959,216 to Hocquet. They make no mention for any application with ultrasonic flow meters, nor recognize the relationship of turbulence with ultrasonic signals.

SUMMARY OF THE INVENTION

The present invention pertains to an apparatus for determining fluid flow in a pipe. The apparatus comprises an ultrasonic flowmeter adapted to be placed with the pipe for measuring fluid flow in the pipe. The apparatus comprises a turbulence-reducing flow conditioner adapted to be disposed in the pipe through which the fluid flow in the pipe passes and upstream to the flowmeter.

The present invention pertains to a turbulence-reducing flow conditioner for an ultrasonic flowmeter for a pipe. The conditioner comprises a plate having holes and a thickness and ligament between holes that is sufficient to withstand forces on the conditioner from the fluid flow in the pipe. The plate reduces turbulence intensity T of the fluid and increases frequency of residual turbulence of the fluid after the fluid has passed through the conditioner for the meter.

The present invention pertains to a method for determining fluid flow in a pipe. The method comprises the steps of flowing the fluid in the pipe through a turbulence reducing flow conditioner wherein the conditioner reduces turbulence intensity T of the fluid and increases frequency of residual turbulence of the fluid after the fluid has passed through the conditioner. Then there is the step of measuring the fluid flow in the pipe with an ultrasonic flowmeter after the fluid flow has passed through the conditioner.

The present invention pertains to a method for reducing turbulence in a pipe for measuring flow in the pipe. The method comprises the steps of placing a turbulence reducing flow conditioner, which includes the pipe that contains it, that pipe being a fluid tight enclosure. The conditioner reduces turbulence intensity T of the fluid and increases frequency of residual turbulence of the fluid after the fluid has passed through the conditioner located in the path of fluid flow. Next there is the step of connecting an ultrasonic flowmeter to measure the fluid flow in the pipe. Then there is the step of directing flowing fluid through the conditioner and the ultrasonic flowmeter.

BRIEF DESCRIPTION OF THE DRAWINGS

In the accompanying drawings, the preferred embodiment of the invention and preferred methods of practicing the invention are illustrated in which:

FIG. 1A is a schematic representation of a cut away view showing a conditioner in a pipe of the present invention.

DETAILED DESCRIPTION

Figure 2:
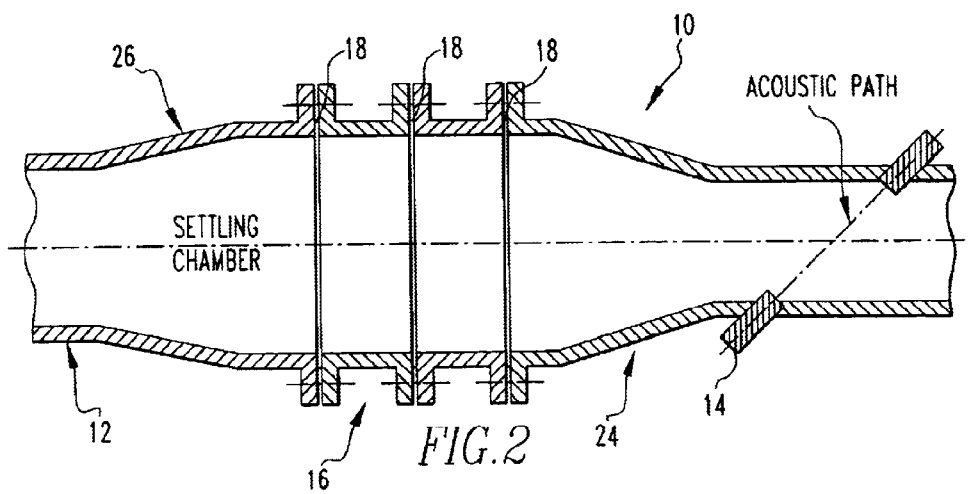
FIG. 2 is a schematic representation of the apparatus of the present invention.

Referring now to the drawings wherein like reference numerals refer to similar or identical parts throughout the several views, and more specifically to FIG. 2 thereof, there is shown an apparatus 10 for determining fluid flow in a pipe 12. The apparatus 10 comprises an ultrasonic flowmeter 14 adapted to be placed with the pipe 12 for measuring fluid flow in the pipe 12. The apparatus 10 comprises a turbulence-reducing flow conditioner 16 adapted to be disposed in the pipe 12 through which the fluid flow in the pipe 12 passes and upstream to the flowmeter 14.

Preferably, the flowmeter is a transit-time ultrasonic flowmeter 14. The conditioner 16 is preferably adapted to be disposed no more than 3 times the diameter of the pipe 12 where the flowmeter 14 is in contact with the pipe 12 from the flowmeter 14. Preferably, the conditioner 16 is adapted to be disposed no less than one half the diameter of the pipe 12 where the flowmeter 14 is in contact with the pipe 12 from the flowmeter 14.

The conditioner 16 preferably reduces turbulence intensity T of the fluid and increases frequency of residual turbulence of the fluid after the fluid has passed through the conditioner 16. The conditioner 16 preferably includes at least one plate 18 having holes 20 and a thickness and ligament 22 between holes 20 that is sufficient to withstand forces on the conditioner 16 from the fluid flow, with the dimensions of the holes and ligaments selected to produce eddies having a high wave number. The wave number is high enough to produce, during a prover run, samples of the lowest residual turbulent frequency sufficient to meet predetermined repeatability objectives. Preferably, the reduction in turbulence in the fluid caused by the conditioner 16 is $$T_1/T_0 = 1/(1+k)^{n/2}$$

Where T=turbulence intensity=$[\frac{1}{3}(u'^2+v'^2+w'^2)]^{1/2}/U$, the subscript 0 refers to incident conditions, the subscript 1 refers to conditions some distance downstream of the plate or plates or screen or screens, sufficient to allow eddies shedding from the screens themselves to have dissipated, u', v', and w' are the rms components of the turbulent velocity variations along the x, y, and z axes, respectively, U is the mean free stream velocity (i.e., at station 0), k is the energy loss per unit volume (head loss) through one screen, and n is the number of screens in cascade.

Preferably, the apparatus 10 includes a convergent nozzle 24 adapted to be disposed between the conditioner 16 and the meter 14. The apparatus 10 preferably includes a divergent nozzle 26 adapted to be disposed upstream to the conditioner 16 wherein the conditioner 16 is between the divergent nozzle 26 and the convergent nozzle 24. Preferably, the apparatus 10 includes at least a second plate 18 disposed downstream to the first plate 18.

The present invention pertains to a turbulence-reducing flow conditioner 16 for an ultrasonic flowmeter 14 for a pipe 12. The conditioner 16 comprises a plate 18 a screen having holes 20 and a thickness and ligament 22 between holes 20 that is sufficient to withstand forces on the conditioner 16 from the fluid flow in the pipe 12. The plate 18 reduces turbulence intensity T of the fluid and increases frequency of residual turbulence of the fluid after the fluid has passed through the conditioner 16 for the meter 14.

Reduction in turbulence in the fluid caused by the conditioner 16 can be $$T_1/T_0 = 1/(1+k)^{n/2}$$

Where T=turbulence intensity=$[\frac{1}{3}(u'^2+v'^2+w'^2)]^{1/2}/U$, the subscript 0 refers to incident conditions, the subscript 1 refers to conditions some distance downstream of the plate or plates or screen or screens, sufficient to allow eddies shedding from the screens themselves to have dissipated, u', v', and w' are the rms components of the turbulent velocity variations along the x, y, and z axes, respectively, U is the mean free stream velocity (i.e., at station 0), k is the energy loss per unit volume (head loss) through one screen, and n is the number of screens in cascade.

The holes 20 and ligament 22 preferably have dimensions that produce turbulence eddies in fluid flowing through the holes 20 which have a diameter less than a nominal turbulence eddy diameter of turbulence eddies in fluid before the fluid has flowed through the holes 20 and in the same order as the dimensions of the ligaments and the holes. The lowest residual turbulent frequency is thereby increased and is in the order of $$f = U/\lambda$$

where f is the lowest turbulent frequency,

U is the mean fluid velocity downstream of the plate, and

λ is the diameter of the eddies produced by the perforated plate.

The present invention pertains to a method for determining fluid flow in a pipe 12. The method comprises the steps of flowing the fluid in the pipe 12 through a turbulence reducing flow conditioner 16 wherein the conditioner 16 reduces turbulence intensity T of the fluid and increases frequency of residual turbulence of the fluid after the fluid has passed through the conditioner 16. Then there is the step of measuring the fluid flow in the pipe 12 with an ultrasonic flowmeter 14 after the fluid flow has passed through the conditioner 16.

Preferably, the measuring step includes the step of measuring the fluid flow in the pipe 12 with the meter 14 after the fluid flow has passed within three times the pipe 12 diameter where the meter 14 is disposed on the pipe 12 from the conditioner 16. The flowing step preferably includes the step of flowing the fluid in the pipe 12 through holes 20 in the conditioner 16 where the holes 20 and minimum ligament 22 between the holes 20 are together of a size that produce turbulence eddies in the fluid flowing through the holes 20 that have a diameter less than a nominal eddy diameter of turbulence in the fluid before it flows through the conditioner 16.

The present invention pertains to a method for reducing turbulence in a pipe 12 for measuring flow in the pipe 12. The method comprises the steps of placing a turbulence reducing flow conditioner 16, which includes the pipe that contains it, that pipe being a fluid tight enclosure. The conditioner 16 reduces turbulence intensity T of the fluid and increases frequency of residual turbulence of the fluid after the fluid has passed through the conditioner 16 located in the path of fluid flow. Next there is the step of connecting an ultrasonic flowmeter 14 to measure the fluid flow in the pipe 12. Then there is the step of directing flowing fluid through the conditioner 16 and the ultrasonic flow meter 14.

In the operation of the present invention, an apparatus to solve the problem of turbulence in ultrasonic flowmeters, as described above, consists of flow conditioning hardware to Reduce the intensity of the turbulence seen by the transit time ultrasonic meter, and Increase the frequency (wave number) of the residual turbulence such that the transit time data samples collected by an ultrasonic meter during a set of prover runs will characterize its steady state performance with a repeatability meeting petroleum industry expectations, where repeatability is as previously defined. A repeatability of 0.02% to 0.05% for a set of 5 prover runs would meet expectations. Each prover run would be in the order of 10 seconds duration.

The apparatus is based on the measures described above, modified to suit the operating environment and unique data collection characteristics of ultrasonic transit time flow measurements.

Figures 1B, 1C:
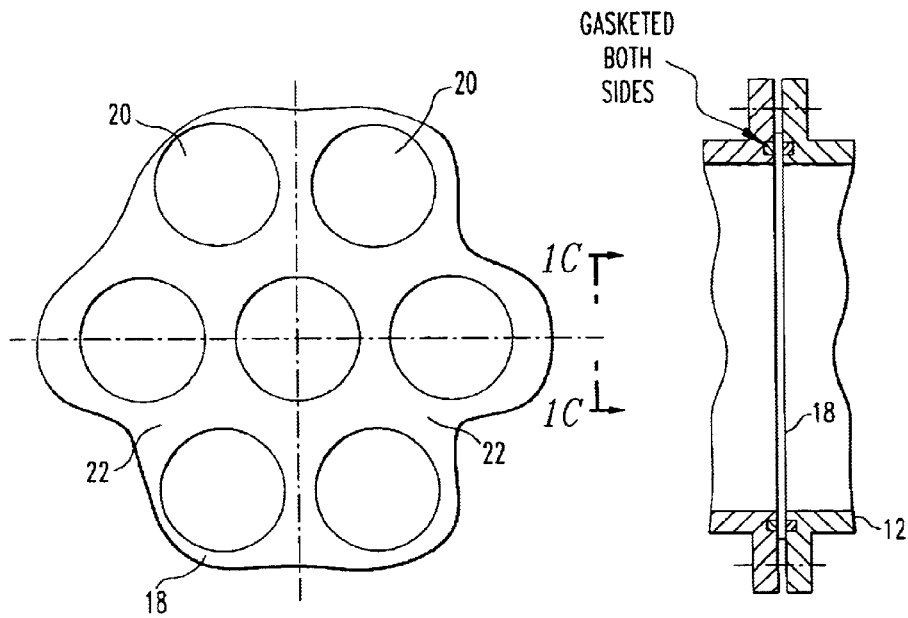
FIG. 1B is a schematic representation of a cut away aside view of a plate of a conditioner in a pipe.
FIG. 1C is a schematic representation of view 1C—1C of FIG. 1B.

The use of fine mesh screens in flowing liquids raises questions of strength and endurance—flow forces may damage a screen mechanically, causing it to carry away and interfere with the operation of a component downstream. Consequently, the conditioner, while making use of the principles of Dryden's screens, must have substantially greater mechanical strength. To satisfy this requirement, the conditioner consists of one or more perforated plates in cascade. Each plate has a thickness and ligament between holes such that stresses on the plate produced by the flowing fluid meet standards acceptable for the service. The holes in each plate are as closely spaced as the ligaments permit. The hole and ligament dimensions are chosen to meet requirements on the frequency content of the turbulence, as described below. A single plate installed in a pipeline is depicted in FIGS. 1A, 1B and 1C. Such a plate, if installed upstream of an ultrasonic flowmeter will reduce the turbulence seen by that meter as calculated in the next paragraph.

The effect of a perforated plate (or grate), like that of FIGS. 1A, 1B and 1C, on the flow field is very similar to that of the screens used by Dryden. The overall pressure loss is essentially identical and is determined primarily by the free (open) area of the grate or screen as against the total area of the duct in which the grate or screen is placed. See the discussion in chapter 8 of Idelchek, *Handbook of Hydraulic Resistance*, also that on orifices in Chapter 4 of this reference, incorporated by reference herein. It should be noted that the shape of the entrance to the flow restriction can also affect the resistance, but to a much lesser extent than the flow area. Hence, a single grate like that of FIG. 1 with a free area of about 0.4 times the pipe cross section would carry a loss coefficient, k, of about 8.75. If, in addition, the grate operates on the free stream turbulence as Dryden's screen did, Equation (2-1) would predict a reduction in turbulence intensity by a factor of 0.32. $T/T_0=[1/(1+k)]^{1/2}=[1/(1+8.75)]^{1/2}=0.32$.

The mechanism whereby Dryden's screens reduce turbulence is hypothesized to be as follows:

The free stream velocity is reduced in the large flow area of the settling chamber The passage of the low velocity free stream through the first screen forms and array of small, orderly (but still turbulent) jets whose diameters are set by the mesh spacing of the screen.

The losses produced by the screen are manifested in very small turbulent eddies produced by the interaction of the jets and the relatively stationary fluid in the lee of the screen wires; the dimensions of these eddies are set by the diameter of the screen wires.

The losses are rapidly converted to heat, because of the high surface area-to-volume ratio of the very small eddies. The jets, meanwhile, merge; Idelchek, *Handbook of Hydraulic Resistance*, indicates that jets produced by a screen or perforated plate will merge in an axial distance of 8 to 12 jet diameters. Since the diameters of the jets are small, the distance to merge is very short in terms of the dimensions of the duct.

The formation of jets in successive screens, in combination with the hydraulic losses produced therefrom, obliterates the global turbulent patterns of the free stream incident to the screens. This factor, in combination with the rapid dissipation, as heat, of the turbulence produced by the screens themselves, leads to a free stream of dramatically reduced turbulence a short distance downstream of the last screen.

The interaction of the viscous fluid with the walls of the duct and the roughness of these walls will act to produce new turbulence. However, the full development; of new turbulence requires an axial distance of many diameters, and a short distance downstream of the screens, the stream can be made nearly free of turbulence.

In Dryden's application, an additional enhancement was used in the form of a convergent entrance connection between the low-velocity settling chamber and a high-velocity test section. This gradual area reduction has the effect of increasing the free stream velocity without altering the character of the turbulence, which, because of the action of the screens, has dimensions that are extremely small relative to those of the convergent section. As a result the turbulence intensity is reduced—the magnitude of the residual turbulent velocity components are unchanged, but the magnitude of the free stream velocity is increased. This measure is effective as long as the convergent section itself introduces no significant turbulence. For this purpose a smooth nozzle is required, with no discontinuities of the slope of the walls, and with a maximum angle of convergence chosen to ensure attachment throughout.

In adapting Dryden's screens to the requirements of ultrasonic custody transfer measurements, the approach taken is as follows:

- As shown in FIG. 1, a perforated plate in lieu of a screen is used, for reasons of mechanical strength.
- The hole size and ligament dimensions are chosen to ensure that residual turbulence downstream of the plates will possess wave numbers consistent with the statistical sampling requirements of the ultrasonic meter.
- The number of plates, in combination with the selected hole and ligament dimensions, is selected to meet the repeatability requirements of the custody transfer application.

An example of the application of these principles to the design of a conditioner in a specific custody transfer application is given in the calculation below.

1. FIG. 2 is a sketch showing the application of the proposed means for reducing turbulence to an ultrasonic flowmeter. In this example, neither the optional divergent nozzle (expander) nor the optional convergent nozzle (reducer) will be employed. The expander is used if the pipeline velocities of the application are high, such that the bending stresses on a grate in the pipeline diameter are higher than desirable (bending stresses vary inversely with pipe diameter). The convergent nozzle is used if the turbulence of the incident stream is high; its use facilitates achieving acceptable levels of turbulence with a reasonable number of screens (and hence, also, a reasonably small pressure drop).
2. As has been noted, the holes and ligaments of the grate are chosen to produce downstream turbulence of high wave number, consistent with proving time requirements. Assume, in the application of this example, it is desired to prove the custody transfer meter with a line prover with fifty feet between timing switches. Assume further that the fluid velocity in the prover and in the pipeline in which the ultrasonic meter is to be installed is 5 feet/second. Thus a single prover run will generate 10 seconds worth of data from the ultrasonic flowmeter. At 5 feet/second, the turbulence spectrum will be rich in frequencies in the range of 4 Hz. See Hishida, previously cited; also, H. Schlichting, *Boundary Layer Theory*, McGraw Hill, 6$^{th}$ edition, incorporated by reference herein. In a 10-second prover run, the ultrasonic flowmeter will collect only about 40 samples of the low frequency velocity variation. Thus, if the free stream turbulence projected onto the acoustic path of a single path ultrasonic flowmeter has an RMS value of, say, 1% in the 4 Hz region, the meter's averaging process of will reduce this turbulence only by $(40)^{-1/2}$ or 6.3. The repeatability of this meter for 5 prover runs would lie in the 0.4% range, a factor of 20 above petroleum industry expectations. This result is independent of the sample data rate of the ultrasonic meter itself, if it is above 4 Hz.

The diameter of the holes in the perforated plate proposed herein and the dimension of the ligament between the holes are selected to increase the wave number (frequency) of the turbulence such that each prover run generates a number of samples sufficient to meet repeatability objectives. The frequency, f, of a turbulent eddy is given by $$f = U/\lambda_e \quad (3\text{-}1)$$

Where U is the free stream velocity and
$\lambda_e$ is the nominal diameter of the eddy.

Suppose, in this example, it is desired to increase turbulent frequency such that 2500 samples of the dominant low turbulence frequency are collected in each prover run. This sample number will reduce the contribution of any low frequency turbulence to variations in the measured meter factor by a factor in the order of $(2500)^{1/2}$ or 50—a reasonable objective. The reduction may not be as large as calculated since some global turbulence, with frequencies lower than 250 Hz can persist downstream of the perforated plate. The lowest turbulent frequency must therefore be in the 250 Hz range, since a 10 second prover run will generate 10×250=2500 samples of turbulent variations in this range.

Using Equation C-1, to compute the nominal eddy diameter, $$\lambda_e = U/f = (5 \text{ ft/sec} \times 12 \text{ inches/ft})/250 \text{ sec}^{-1} = 0.24 \text{ inches}$$

The nominal diameters of the eddies generated by the perforated plate are determined principally by the dimensions and shape of the ligaments between holes, though the diameter of the jets may also play a role. If a triangular pitch is used and holes are 0.25 inches in diameter with a minimum ligament between holes of 0.125 inches, it is unlikely that eddy dimensions larger than 0.24 inches. Hence, this hole configuration is likely to meet the sample frequency objective stated above.

3. Returning to FIG. 2 (and remembering that neither the divergent or convergent sections are used in this example), the loss coefficient for each plate is now calculated. The effective free area ratio, $F_A$, of the triangular pitch hole array is given by the area of the hole, divided by the area of an equilateral triangle whose side is the sum of the hole diameter and the minimum ligament dimension. In the case of this example:

$$F_A = [\pi/4(\tfrac{1}{4})^2]/[\sin(60°) \times (\tfrac{1}{4}+\tfrac{1}{8})^2] = 0.403$$

As has previously been noted, Idelchek, previously cited, provides a loss coefficient of 8.75 for a single plate with this free area ratio. Hence the reduction in turbulence for the 3 plates in FIG. 2 should be (after the losses produced by the screen dissipate)

$$T_1/T_0 = 1/(1+8.75)^{3/2} = 0.033$$

Suppose the incident turbulence of the free stream is 1.6% RMS, averaged along the acoustic paths or paths of the ultrasonic flowmeter. The array of screens shown in FIG. 2 would reduce this turbulence to 0.05% RMS. Since the frequency of the residual turbulence has been increased by the perforated plate configuration to 250 Hz, the contribution of turbulence to the variability of meter factor in a single 10 second prover run will be reduced by as much as a factor of 50, to as little as 0.0007% RMS. If the performance approaches this figure, the repeatability of the meter factors over 5 prover runs will be in the 0.16% range, meeting or exceeding the industry expectations.

4. The pressure loss across each plate in the configuration of FIG. 2 is about 3.4 feet with the free stream velocity of 5 ft/sec. With a typical petroleum product specific gravity of 0.8, this corresponds to a pressure differential of 1.2 psi. If a plate thickness of ¼ inch is chosen, this pressure drop will not lead to excessive bending stresses, in pipes 18 inches or more in diameter. Furthermore the aggregate pressure drop of the 3 screen array of FIG. 2, under 4 psi, will not lead to an excessive pumping power penalty—in a 12 inch diameter pipe less than 4.5 hydraulic horsepower.
5. The spacing between perforated plates should be at least 12, and preferably about 20 hole diameters. This spacing allows the jets from one plate to merge fully, before the flow stream enters the holes of the second plate. For the plate configuration of FIG. 2 (¼ inch diameter holes), a spacing of at least 3 and preferably 5 inches is indicated. The upstream most ultrasonic flowmeter should be located at least one duct diameter downstream of the last plate (In Dryden's research, the distance was varied but most data were collected with at least the equivalent of 3 duct diameters between the screens and the turbulence measurements. About 2 diameters are recommended; a longer distance risks the creation of additional turbulence.

Depending on the configuration of their acoustic paths and other factors, the meter factors of ultrasonic flowmeters can be affected by the overall shape of the axial velocity profile, and by global transverse vortices such as swirl. The conditioner for reducing turbulence will flatten the axial velocity profile, and reduce or eliminate global vortices, thereby reducing the sensitivity of the ultrasonic meters to these factors.

In general, it is desirable to minimize the axial length requirement of the means for flow measurement in a custody transfer application, including the length required by any flow conditioning devices. Additionally, too long a distance between the conditioner and the ultrasonic flowmeter may allow new turbulence to form, due to interaction between the fluid and the wall of the pipe between the conditioner and the meter, and thus diminish the effectiveness of the conditioner. On the other hand, the effectiveness of the diffuser may also be diminished if the flow measurement is too close to the perforated plates, case (1), or the convergent nozzle, case (2)-too close a location will cause the flowmeter to "see" the local turbulence created by the diffuser.

Based on these considerations, the following requirements are given:

For configuration (1), the shortest distance between the acoustic paths of the ultrasonic flowmeter and the perforated plates should be at least 20 times the larger of the diameter of the holes of the plate and the ligament between the holes. The separation distance should not exceed 3 times the diameter of the pipe in the way of the ultrasonic flowmeter. These distances are based on Dryden's experimental measurements of turbulence. A description of these experiments is included as a reference in the disclosure.

For configuration (2), the distance between the acoustic paths of the ultrasonic flowmeter and the trailing edge of the convergent nozzle should be not less than ½ the flowmeter diameter, nor more than 1 flowmeter diameter. These numbers are based on experiment with precision flow nozzles and ensure that the boundary layer in the way of the flowmeter is attached and well behaved.

Repeatability tests were performed at an NIST traceable laboratory. In order to evaluate repeatability, a 6" turbine meter was used as the reference for repeatability tests (weigh tank tests were too long for typical prover tests). Tests were taken at 3500 gpm, 3000 gpm, 2000 gpm, 1000 gpm, and 500 gpm. Five test runs of 1 minute, 30 seconds and 15 second were performed at each flow rate.

Figure 3:
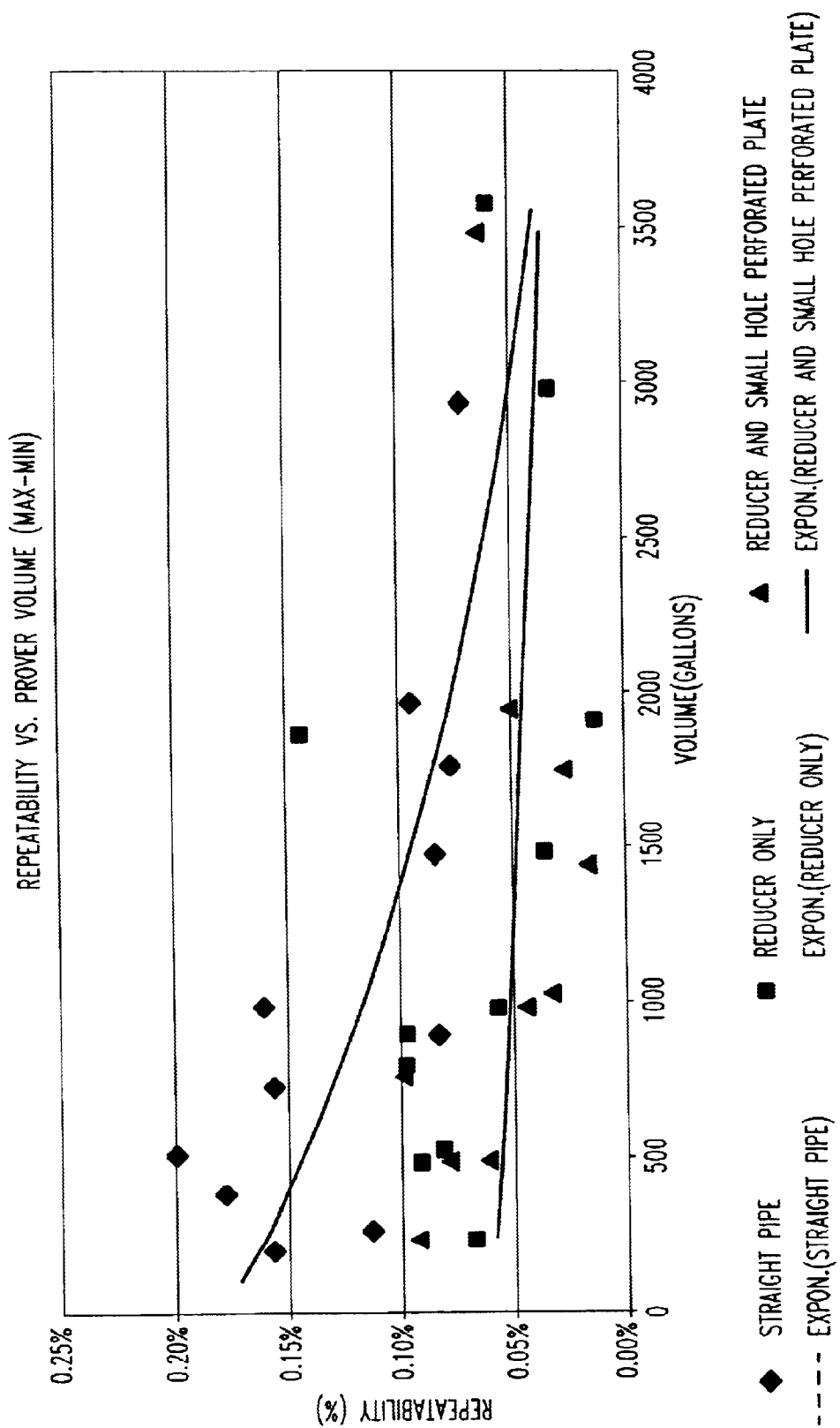
FIG. 3 is a graph showing the improvement in repeatability brought about by the use of two elements of the invention, as against the total volume employed by a prover.
Figure 4:
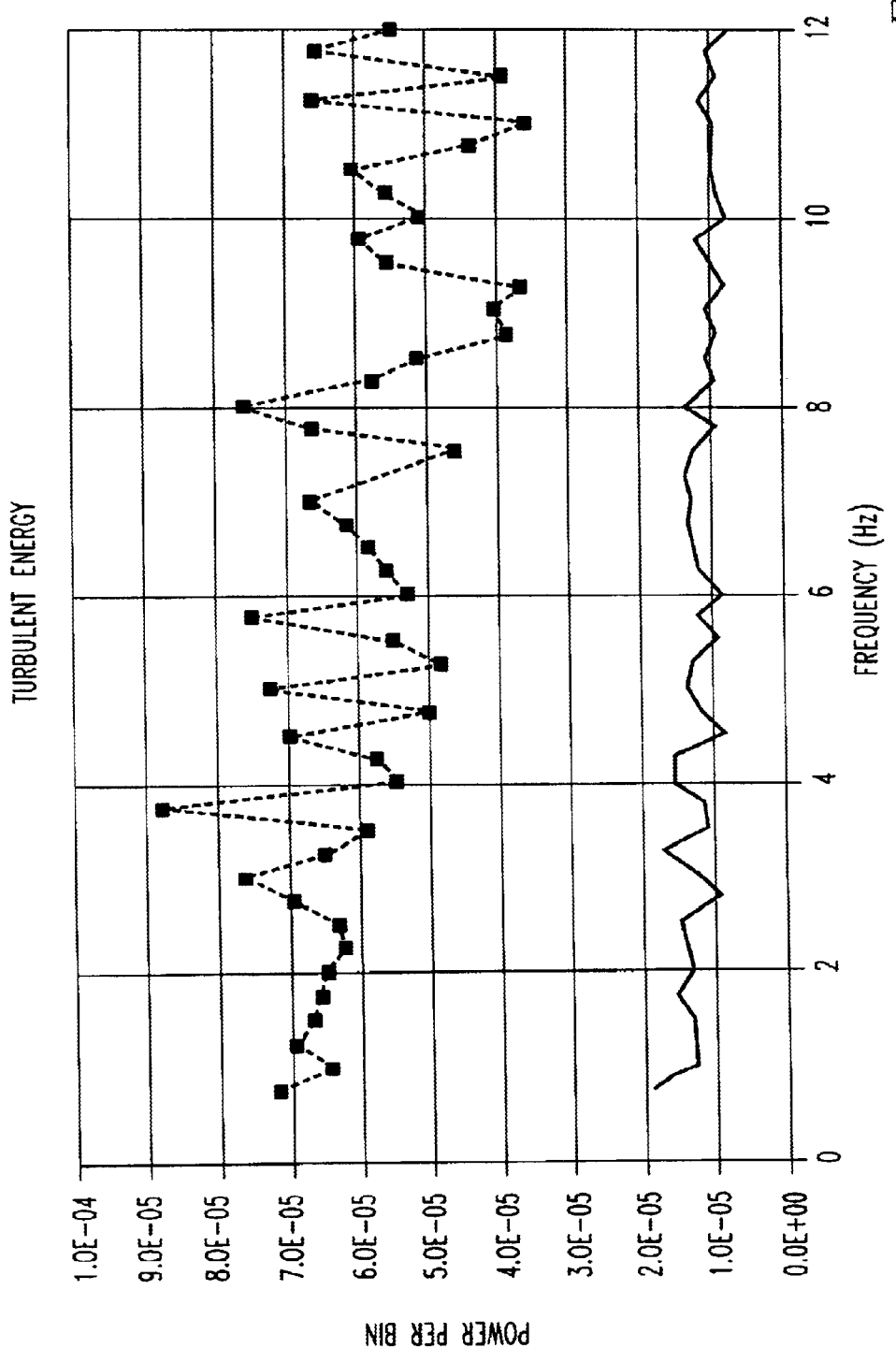
FIG. 4 is a graph of the turbulence energy spectrum.

FIG. 3 illustrates the performance observed with the turbulence diffuser.

The following performance was observed:
1. By using longer tests and/or higher flow-rates, the repeatability is always improved.
2. Turbulence diffusers (i.e., a small hole plate with a reducer) substantially improve repeatability.

While repeatability is the fundamental measure of interest, the standard deviation of instantaneous measurements is another indicator of the effectiveness of the turbulence diffuser. The performance of the diffuser with respect to instantaneous measurement standard deviation is summarized in the following table.

| Cases | Net Instantaneous Measurement Standard Deviation |
|---|---|
| Straight Pipe No Diffuser Mechanism | 1.75% |
| Large Hole Perforated Plate | 1.61% |
| Small Hole Perforated Plate | 0.93% |
| Reducer Immediately Upstream | 0.63% |
| Reducer/Large Hole Perforated Plate | 0.64% |
| Reducer/Small Hole Perforated Plate | 0.59% |

The above mentioned trends in performance were mirrored by trends in the frequency content and correlation between acoustic data, as follows:
1. In straight pipe, there is consistently, a correlation between paths. The closer two paths are to each other, the stronger the correlation. The long paths were correlated ~15%, negatively correlated. The long path to short path correlation was between 5 to 9% positively correlated.
2. The repeatability of multiple path ultrasonic flowmeters is sometimes adversely affected by the correlation of turbulent disturbances projecting onto two or more acoustic paths. On the ultrasonic meter with which the diffuser was tested, the turbulent diffuser also decreased the correlation of turbulent velocities measured by adjacent acoustic paths, thereby further improving repeatability.
3. The half power frequency (frequency at which ½ power is above and ½ power is below) With all turbulent diffuser cases, the half power frequency did raise in value. See FIG. 5.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for determining fluid flow in a pipe comprising:
   an ultrasonic flowmeter placed with the pipe for measuring fluid flow in the pipe having a repeatabilty of less than or equal to 0.05%; and
   a turbulence-reducing flow conditioner disposed in the pipe through which the fluid flow in the pipe passes and at a position in the pipe upstream to the flowmeter.

2. An apparatus as described in claim 1 wherein the flowmeter is a transit-time ultrasonic flowmeter.

3. An apparatus as described in claim 2 wherein the conditioner is adapted to be disposed no more than 3 times the diameter of the pipe where the flowmeter is in contact with the pipe from the flowmeter.

4. An apparatus as described in claim 3 wherein the conditioner is adapted to be disposed no less than one half the diameter of the pipe where the flowmeter is in contact with the pipe from the flowmeter.

5. An apparatus as described in claim 4 wherein the conditioner reduces turbulence intensity T of the fluid and increases frequency of residual turbulence of the fluid after the fluid has passed through the conditioner.

6. An apparatus as described in claim 5 wherein the conditioner includes at least one plate or screen having holes and a thickness and ligament between holes that is sufficient to withstand forces on the conditioner from the fluid flow, with the dimensions of the holes and ligaments selected to produce eddies having a high enough wave number to produce, during a prover run, samples of the lowest residual turbulent frequency sufficient to meet predetermined repeatability objectives.

7. An apparatus as described in claim 6 wherein the reduction in turbulence in the fluid caused by the conditioner is $$T_1/T_0 = 1/(1+k)^{n/2}$$

Where

T=turbulence intensity=$[\frac{1}{3}(u'^2+v'^2+w'^2)]^{1/2}/U$, the subscript 0 refers to incident conditions, the subscript 1 refers to conditions some distance downstream of the plate or plates or screen or screens, sufficient to allow eddies shedding from the screens themselves to have dissipated, u', v', and w' are the rms components of the turbulent velocity variations along the x, y, and z axes, respectively, U is the mean free stream velocity (i.e., at station 0), k is the energy loss per unit volume (head loss) through one screen, and n is the number of screens in cascade.

8. An apparatus as described in claim 7 including a convergent nozzle adapted to be disposed between the conditioner and the meter.

9. An apparatus as described in claim 8 including a divergent nozzle adapted to be disposed upstream to the conditioner wherein the conditioner is between the divergent nozzle and the convergent nozzle.

10. An apparatus as described in claim 9 including at least a second plate disposed adjacent the first plate.

11. A turbulence-reducing flow conditioner for an ultrasonic flowmeter for a pipe comprising:

a plate or screen having holes and a thickness and ligament between holes that is sufficient to withstand forces on the conditioner from the fluid flow in the pipe, the plate reduces turbulence intensity T of the fluid and increases frequency of residual turbulence of the fluid after the fluid has passed through the conditioner for the meter so the flowmeter has a repeatability of less than or equal to 0.05%.

12. A conditioner as described in claim 11 wherein reduction in turbulence an the fluid caused by the conditioner is $$T_1/T_0 = 1/(1+k)^{n/2}$$

where T=turbulence intensity=$[\frac{1}{3}(u'^2+v'^2+w'^2)]^{1/2}/U$, the subscript 0 refers to incident conditions, the subscript 1 refers to conditions some distance downstream of the plate or plates or screen or screens, sufficient to allow eddies shedding from the screens themselves to have dissipated, u', v', and w' are the rms components of the turbulent velocity variations along the x, y, and z axes, respectively, U is the mean free stream velocity (i.e., at station 0), k is the energy loss per unit volume (head loss) through one screen, and n is the number of screens in cascade.

13. A conditioner as described in claim 12 wherein the holes and ligament have dimensions that produce turbulence eddies in fluid flowing through the holes which have a diameter less than a nominal turbulence eddy diameter of turbulence eddies in fluid before the fluid has flowed through the holes and in a same order as the dimensions of the ligaments and the holes, where a lowest residual turbulent frequency is thereby increased and is in the order of $$f = U/\lambda$$

where f is the lowest turbulent frequency,

U is the mean fluid velocity downstream of the plate, and $\lambda$ is the diameter of the eddies produced by the perforated plate.

14. A method for determining fluid flow in a pipe comprising the steps of:

flowing the fluid in the pipe through a turbulence reducing flow conditioner wherein the conditioner reduces turbulence intensity T of the fluid and increases frequency of residual turbulence of the fluid after the fluid has passed through the conditioner; and measuring the fluid flow in the pipe with an ultrasonic flowmeter having a repeatability of less than or equal to 0.05% after the fluid flow has passed through the conditioner.

15. A method as described in claim 14 wherein the measuring step includes the step of measuring the fluid flow in the pipe with the meter after the fluid flow has passed within three times the pipe diameter where the meter is disposed on the pipe from the conditioner.

16. A method as described in claim 15 wherein the flowing step includes the step of flowing the fluid in the pipe through holes in the conditioner where the holes and minimum ligament between the holes are together of a size that produce turbulence eddies in the fluid flowing through the holes that have a diameter less than a nominal eddy diameter of turbulence in the fluid before it flows through the conditioner.

17. A method for reducing turbulence in a pipe for measuring flow in the pipe comprising the steps of:

placing a turbulence reducing flow conditioner in a pipe wherein the conditioner reduces turbulence intensity T of the fluid and increases frequency of residual turbulence of the fluid after the fluid has passed through the conditioner located in the path of fluid flow;

connecting an ultrasonic flowmeter having a repeatability of less than or equal to 0.05% to measure the fluid flow in the pipe; and directing flowing fluid through the conditioner and the ultrasonic flowmeter.

18. A method as described in claim 17 wherein the directing step includes the step of proving the reliability of the flowmeter over 5 proven runs.

19. A method as described in claim 18 wherein the directing step includes the step of directing liquid through the conditioner.

20. A method as described in claim 19 wherein the directing step includes the step of directing liquid petroleum products through the conditioner.

* * * * *